United States Patent [19]

Espinosa

[11] Patent Number: 5,448,218
[45] Date of Patent: Sep. 5, 1995

[54] ANTI-THEFT ALARM SYSTEM FOR A MOTOR VEHICLE

[75] Inventor: Indalecio Espinosa, Miami, Fla.

[73] Assignee: Protector 2000, Inc., Hialeah, Fla.

[21] Appl. No.: 114,458

[22] Filed: Aug. 31, 1993

[51] Int. Cl.6 ............................................. B60R 25/10
[52] U.S. Cl. ..................... 340/426; 180/287;
    307/10.2; 342/457; 340/539; 379/58
[58] Field of Search ............ 340/426, 539, 541;
    307/10.2; 180/287; 379/58; 342/457

[56] References Cited

U.S. PATENT DOCUMENTS

| | | | |
|---|---|---|---|
| 4,067,411 | 1/1978 | Conley et al. | 340/426 |
| 4,177,466 | 12/1979 | Reagan | 342/456 |
| 4,596,988 | 6/1986 | Wanka | 342/457 |
| 4,652,860 | 3/1987 | Weishaupt et al. | 180/287 |
| 4,691,801 | 9/1987 | Mann et al. | 180/287 |
| 4,897,630 | 1/1990 | Nykerk | 340/426 |
| 4,908,629 | 3/1990 | Apsell et al. | 342/457 |
| 4,910,493 | 3/1990 | Chambers et al. | 340/539 |
| 4,991,683 | 2/1991 | Garretto et al. | 180/287 |
| 5,055,851 | 10/1991 | Sheffer | 340/539 |
| 5,081,667 | 1/1992 | Drori et al. | 340/539 |
| 5,276,728 | 1/1994 | Pagliaroli et al. | 180/287 |

FOREIGN PATENT DOCUMENTS

| | | | |
|---|---|---|---|
| 0505266 | 9/1992 | European Pat. Off. | 340/426 |
| 0051629 | 4/1977 | Japan | 180/284 |
| 2233487 | 1/1991 | United Kingdom | 340/426 |

*Primary Examiner*—Brent Swarthout
*Attorney, Agent, or Firm*—Malloy & Malloy

[57] ABSTRACT

An anti-theft alarm system designed for use with a motor vehicle such as an automobile which includes a logic control assembly activated by a transmitted, coded signal being sent to a receiver and decoder connected to the logic control system for the activation and operation of a fuel valve control mechanism, an ignition control and associated timer mechanism, and a mobile transmitter structure mounted on and carried with the motor vehicle. Activation of the system may occur by authorized personnel calling into a central telephone switching office by means of a conventional subscriber, touchtone telephone or a cellular telephone.

6 Claims, 1 Drawing Sheet

ANTI-THEFT ALARM SYSTEM FOR A MOTOR VEHICLE

BACKGROUND OF THE INVENTION

1. Field of the Invention

The present invention is directed to an anti-theft alarm system utilized with a motor vehicle such as but not limited to an automobile or the like wherein activation of the system is accomplished by an authorized person calling, by means of a cellular telephone or conventional touchtone subscriber telephone, into a remote transmitter which in turn signals and activates a logic control assembly associated with the subject alarm system and carried on the automobile.

2. Description of the Prior Art

The theft of automobiles has become a major problem in most modern, industrialized societies. Such auto theft has resulted in numerous types of alarm systems effectively built into the construction of the automobile or becoming either an added assembly or an original part thereof. Numerous ones of such devices are directed to the disabling of the vehicle in some sort upon an unauthorized person entering the vehicle and attempting to operate the vehicle in a somewhat conventional manner once access has been gained to the ignition system. Typically, such prior art and/or known systems include some type of fuel cutoff anti-theft device which restricts the flow of fuel to the engine. One problem associated with such devices is the initial activation thereof at an appropriate time when actual theft is taking place and the safe disabling of the vehicle such as when the unauthorized personnel actually begins operation of the vehicle.

Numerous patents, as evidenced by the following United States patents, are representative of the patented prior art on devices directed to the problem of vehicle security. Such patents include Newby, U.S. Pat. No. 4,990,890 including a security system which monitors a plurality of vehicles and further which includes an immobilizer and a transceiver monitored by a number of security stations which detect signals emitted by vehicles when an authorized use or break-in occurs. As part of this system, the alarm components include numerous type of signalling or warning devices such as beepers, horns, activation of lights, etc.

The patent to Gosker, U.S. Pat. No. 5,045,837, represents a variety of structures which relies primarily on cutting off fuel to the engine when unauthorized use or access to the vehicle has been established. This patented device is directed to a fuel control valve and a control device for operating the valve wherein activation of the system is accomplished by a remote keypad through which the user inputs a coded sequence of input signals to operate the valve. Direct signalling occurs between the keypad and/or any transmission assembly associated therewith and receiver unit associated with the alarm system mounted on the vehicle.

The patent to Drori, et al., U.S. Pat. No. 5,081,667, relates to a vehicle security system and more specifically to an interfacing assembly for integrating a wide variety of cellular communication systems with the vehicle security system attached to the automobile. Incumbent upon the utilization of this patented invention is the presence of a cellular telephone system, per se, within the vehicle so that contact and communication can be established between a remote caller and the cellular unit within the motor vehicle and thereby serving to contact and/or activate the security system associated therewith.

Other patented systems are disclosed in the following U.S. Pat. No. to Torres, 4,857,888: Faust, U.S. Pat. No. 4,875,350; and Carlo, U.S. Pat. No. 4,958,084.

Even based on the presence of the known prior art systems, as set forth above, theft of motor vehicles is still a well-recognized problem existing in virtually all communities of the United States. There is therefore a need for an efficient anti-theft alarm system for automobiles or like motor vehicles which can be easily activated from any conventional, subscriber telephone and/or cellular telephone terminal and further wherein various ones of a plurality of components associated with the alarm system can be activated for purposes of defeating theft or other unauthorized use.

SUMMARY OF THE INVENTION

The present invention is directed towards an anti-theft alarm system to be used in combination with automobiles or like motor vehicles. In operation, an owner or authorized user, once detecting the theft or other unauthorized use of a vehicle activates the system by placing a telephone call, either through a conventional subscriber touchtone telephone or alternately through a cellular telephone to a designated, predetermined telephone number. The call is routed through a central telephone switching office which in turn directs the call to a contact terminal or "beeper" terminal which in turn activates a transmitter. The transmitter sends out an activating signal to a portion of the control system which is mounted on and which travels with the motor vehicle being protected. A receiver, considered a part of the subject alarm system is structured to receive the activating signal from the aforementioned transmitter and in turn the signal is decoded from the coded input subscribed thereto by the activating telephone call of the user. For example, the vehicle identification number may be part of the code so that the vehicle in question may be contacted to the extent that the alarm system associated therewith may be activated. The alarm system includes a control means which is defined in part by a logic control assembly. This control assembly includes proper circuitry which, when activated by the receipt of the activating signal from the transmitter will in turn activate one or all of a plurality of components. Such predetermined components include a fuel control valve. This valve is structured, once activated, to diminish or stop the flow of fuel to the carburetor of the internal combustion engine which serves to power the motor vehicle. Proper care is taken to diminish the fuel on a gradual basis due to the safety factor. More specifically, the fuel control valve may be activated during high speed operation of the vehicle and an immediate shut off of the fuel would result in danger to the occupants and/or to surrounding automobiles.

In addition, an ignition control means is activated. A timer mechanism, associated therewith, may delay the disabling of the ignition of the automobile through activation and operation of the ignition control means to the extent that restarting of the automobile, once stopped and after a predetermined time period has elapsed, would be impossible.

Another of the plurality of components associated with the subject alarm system includes a mobile transmitter, preferably of a low power variety, which sends out a signal on either a constant or periodic basis. This resulting monitoring signal emitted by the mobile transmitter is meant to be received by one or more monitoring receivers located remote from the automobile such as that being maintained at a central police headquarters or in police automobiles.

Other ones of the predetermined plurality of components may include a voice announcement assembly which replicates the voice of a human and provides continuous messages to the extent that the use of the subject vehicle is unauthorized. Similarly, a number of signals may be concurrently activated wherein each of the signals corresponds to the activation and operation of the aforementioned plurality of components. Such signals may be in the form of dashboard lights (L.E.D.) or other types of audible or visual mechanisms which inform the occupants and/or surrounding personnel as to the condition of unauthorized use of the vehicle.

Other types of auxiliary alarms may also be concurrently activated once the entire alarm system is activated by the aforementioned logic control assembly. Such additional alarms may include lights flashing, horns beeping, alarm bells, the emission of smoke, etc. from the engine compartment.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
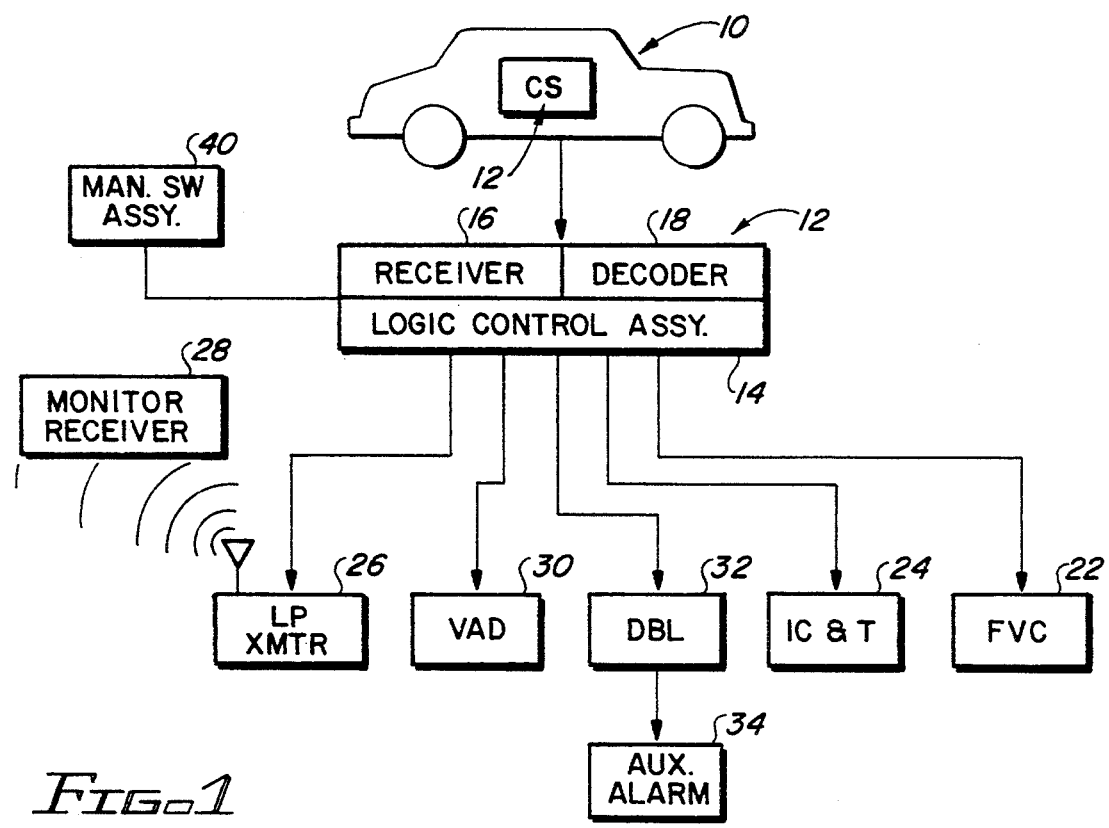
FIG. 1 is a schematic representation of the portion of the subject alarm system associated directly with an automobile being protected and movable therewith.

As shown in the accompanying figures, the present invention is directed to an anti-theft alarm for the protection of automobiles or like motor vehicles wherein the automobile is schematically represented as 10. The control means associated therewith is generally indicated as 12 and is represented as being carried by the automobile and also is shown in more detail as part of FIG. 1. In any event, the control means 12 includes a logic control assembly 14 connected directly to both a receiver unit 16 and a decoder 18 associated and connected to both the receiver and the logic control assembly 14. The decoder 18 serves to decode an incoming activating signal sent to the automobile 10 and more specifically to the control means 12 by a transmitter generally indicated as 20 (see FIG. 2). The transmitter, as will be explained in greater detail hereinafter, may operate on either a VHF or a UHF range to send an activating signal specifically to the receiver unit 16 associated with the alarm system or the control means 12. Once received and decoded, the logic control assembly is automatically activated through the aforementioned interconnection between the receiver 16, the decoder 18, and the logic control assembly 14. Proper circuitry (not shown for purposes of clarity) is defined within the logic control assembly and serves to independently activate either on a staggered basis or concurrently a plurality of predetermined components.

Such predetermined components are more specifically defined by a fuel control valve generally indicated as 22. The fuel control valve 22 is specifically structured so as to gradually diminish the flow of fuel, over a predetermined period of time, to the carburetor of the internal combustion engine serving to power the motor vehicle 10. This is accomplished for purposes of safety since the entire alarm system or more specifically the control means 12 may be activated during a high speed operation of the vehicle. If the fuel were to be cut off suddenly and without any gradual depletion of the fuel supply, an accident could result as well as harm to the occupants of the stolen vehicle or occupants of surrounding vehicles.

In addition, an ignition control assembly generally indicated as 24 is activated. This ignition control assembly has a timer mechanism associated therewith for purposes of predetermining a time of activation during which period the ignition of the automobile is incapacitated. As a result, once the vehicle comes to a stop and the fuel is totally shut off, on a gradual basis, it will be impossible to restart the engine regardless if fuel is present in the carburetor or not since the ignition portion of the internal combustion engine is totally disabled.

Another one of the plurality of components includes a mobile transmitter generally indicated as 26 which of course is carried with the vehicle 10. The transmitter 26 may be a mobile, low powered transmitter designed to send out a monitoring signal on either a continuous or periodic basis, again over a predetermined period of time. Such a monitoring signal is intended to be received by one or a plurality of monitoring receivers generally indicated as 28 and located of course remotely from the vehicle 10. Such monitoring receivers can be present in either a central police facility or one a number of police automobile units in search of the stolen vehicle 10.

Other predetermined ones of the plurality of components may include a voice announcement or enunciation device being digitally operated and generally indicated as 30. The structure of this device is such that a synthetic or computerized voice will periodic make announcement as to the condition of the vehicle to the extent that an unauthorized use or theft is currently underway. Such announcements can be made within the automobile and exteriorly of the automobile so as to warn surrounding personnel.

In addition, a signal means is generally indicated as 32 wherein such signal means can be in the form of at least one but preferably a plurality of visual signal mechanisms such as warning lights (L.E.D.) mounted on the dashboard of the vehicle or in any other location. Such warning lights are clear indication or signals that the various components such as the fuel control valve, ignition control assembly, mobile transmitter, voice announcement device, etc., is currently operating and that such components have been activated.

Finally, the alarm system of the present invention may include one or more auxiliary alarms which indicate to the surrounding personnel that unauthorized use is occurring. Such auxiliary alarm systems generally indicated as 34 may be such devices as forcing the horn to blow, the lights to blink, smoke issuing from the motor compartment, etc.

While the subject alarm system is preferably activated from a remote location through the placing of a telephone call as it will be explained in greater detail with regard to the components of FIG. 2, the entire alarm system may be operated or activated manually by means of a manual switch assembly generally indicated as 40. The manual switch assembly 40 may be a manually activated switch which may also be associated with some type of time delay mechanism and/or a physical activation mechanism such that when a door opens on an unauthorized basis and/or the ignition is tampered with, the switching assembly associated with the manual switch assembly 40 may be automatically activated to in turn activate and operate the logic control assembly and thereby activate the various ones of the predetermined plurality of components as set forth above.

Figure 2:
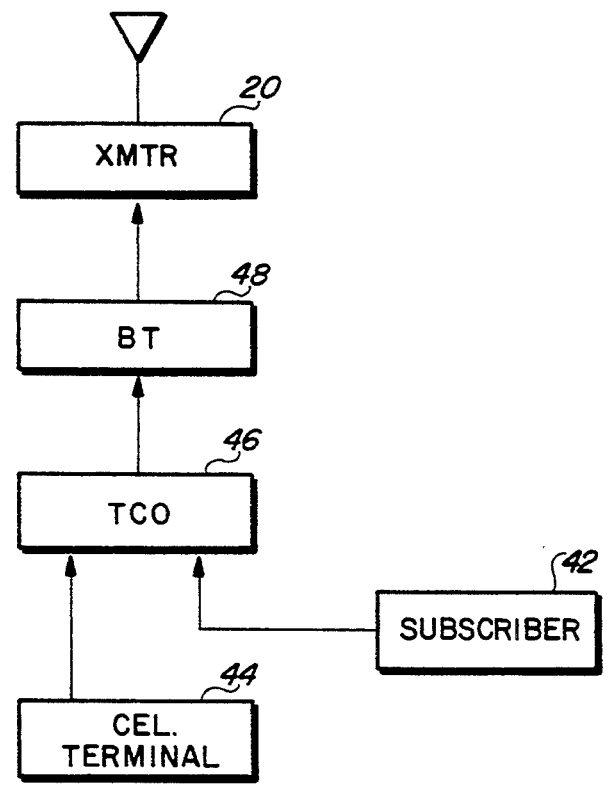
FIG. 2 is a schematic representation of a transmitter assembly utilized for the activation of the logic control assembly and other plurality of components associated with the subject alarm system mounted on the automobile.

With regard to FIG. 2, operation and activation of the subject alarm system may of course occur from a remote control basis. This is accomplished by an authorized user or owner of the vehicle 10 calling a predetermined number and further entering through a touchtone phone generally indicated as 42 an identification or code number such as the vehicle identification number. A telephone call may be made by means of a conventional subscriber, touchtone phone 42. Alternately, a cellular telephone and/or terminal may be utilized which is indicated as at 44. Regardless of the mode of the input telephone call, such calls will be routed to a central telephone switching facility generally indicated as 46. From there, and after the code has been input, a coding terminal or "beeper" terminal generally indicated as 48 is contacted and activated by routing from the central switching office 46. The signal will therefore be coded and the signal will be sent to a central transmitter 20 which is structurally adapted to transmit the activating signal which in turn, is coded. This coded signal is then received and subsequently decoded by the receiver 16 and decoder 18 defined as part of the control means 12 described above.

Now that the invention has been described,
What is claimed is:

1. An alarm system designed for and mounted at least partially within a motor vehicle, said system comprising:
   (a) transmitter actuating means comprising a conventional telephone means for dialing a predetermined telephone number and for entering a predetermined identification code that is sent to a central telephone switching facility;
   (b) a coding terminal in operative communication with said central telephone switching facility, said coding terminal being structured to convert said predetermined identification code into a coded activating signal;
   (c) a transmitter means in operative communication with said coding terminal, said transmitter means being structured and disposed to transmit said coded activating signal to a motor vehicle located remote from said transmitter means and said telephone means;
   (d) a control means mounted on said remote motor vehicle for controlling operation of the alarm system, said control means including a receiver, a decoder, and a logic control assembly;
   (e) said receiver being structured and disposed to receive said coded activating signal;
   (f) said decoder being operatively connected to said receiver and said logic control assembly, said decoder being structured to decode said coded activating signal;
   (g) said logic control assembly being operatively connected to said receiver and said decoder, said logic control assembly being structured to activate a plurality of components of said alarm system after said coded activating signal is decoded;
   (h) said plurality of components of said alarm system including a fuel control valve, an ignition control assembly, a mobile transmitter, and a voice announcement assembly, each operatively connected to said logic control assembly;
   (i) said fuel control valve being structured to gradually diminish the supply of fuel to said remote motor vehicle until said motor vehicle stops;
   (j) said ignition control assembly being structured to disable an ignition of said remote motor vehicle and to prevent restarting subsequent to being activated by said logic control assembly;
   (k) said mobile transmitter being structured to transmit a monitoring signal from said remote motor vehicle;
   (l) said voice announcement assembly being structured and disposed to announce a predetermined message regarding unauthorized use of said motor vehicle; and
   (m) a plurality of visually detectable signal devices structured and disposed to signal occupants of said remote motor vehicle of the activation and operative condition of said plurality of components of said alarm system, each said signal device being operatively connected to a different one of said components of said alarm system.

2. A system as recited in claim 1 further comprising a manual actuation assembly operatively connected to said logic control assembly in by-passing relation to said receiver and said decoder, said manual actuation assembly being structured and disposed to manually activate said plurality of components through said logic control assembly.

3. A system as recited in claim 1 wherein said ignition control assembly includes a timer mechanism associated therewith, said timer mechanism being structured and disposed for regulating a predetermined time period within which said ignition of said motor vehicle will be disabled.

4. A system as recited in claim 1 wherein said transmitter actuating means comprises a touchtone telephone.

5. A system as recited in claim 1 wherein said transmitter actuating means comprises a cellular telephone.

6. A system as recited in claim 1 wherein said transmitter means is structured to transmit said coded activating signal over either a VHF or UHF range.

* * * * *